United States Patent [19]

Schindele

[11] Patent Number: 4,807,659
[45] Date of Patent: Feb. 28, 1989

[54] SYMMETRICAL SINGLE MEDICAL GAS RAIL APPARATUS

[75] Inventor: Ernst F. Schindele, Stamford, Conn.

[73] Assignee: Fairfield Medical Products Corporation, Stamford, Conn.

[21] Appl. No.: 221,108

[22] Filed: Jul. 19, 1988

[51] Int. Cl.4 ............................................. F16L 5/00
[52] U.S. Cl. .................................. 137/360; 137/271; 285/137.1
[58] Field of Search ............... 285/137.1; 137/271, 137/356, 357, 360

[56] References Cited

U.S. PATENT DOCUMENTS

| 2,645,783 | 7/1953 | Allen | 285/137.1 |
| 3,470,901 | 10/1969 | Nisley | 137/360 |
| 4,080,752 | 3/1978 | Burge | 285/137.1 |
| 4,082,324 | 4/1978 | Obrecht | 285/137.1 |
| 4,498,693 | 2/1985 | Schindele | 285/137.1 |

FOREIGN PATENT DOCUMENTS 7802636 10/1979 Sweden ............................ 137/357

Primary Examiner—A. Michael Chambers
Attorney, Agent, or Firm—Parmelee, Bollinger & Bramblett

[57] ABSTRACT

A symmetrical gas rail is provided with first and second ends thereon having a cental opening therethrough which provides a conduit for the conduction of fluid flow therethrough. The rail has a generally square configuration with four corners such that the front profile of the rail is the same even when the rail is rotated 360° in 90° increments. The rail is adapted to mount a variety of apparatus such as medical equipment and lighting in at least one set of the aligned, spaced opposed grooves in any 90° position in the 360° field. A gas feed is coupled to one of the rail and an access coupling is provided at any point along the rail to provide access to the fluid flow therein. The symmetrical configuration allows flexibility in mounting the rail in four different positions on a permanent mount or rotatably mounting the rail in a pedestal mount which may be positioned on a wall or up off the floor e.g. between two rows of beds in patient care facilities.

8 Claims, 3 Drawing Sheets

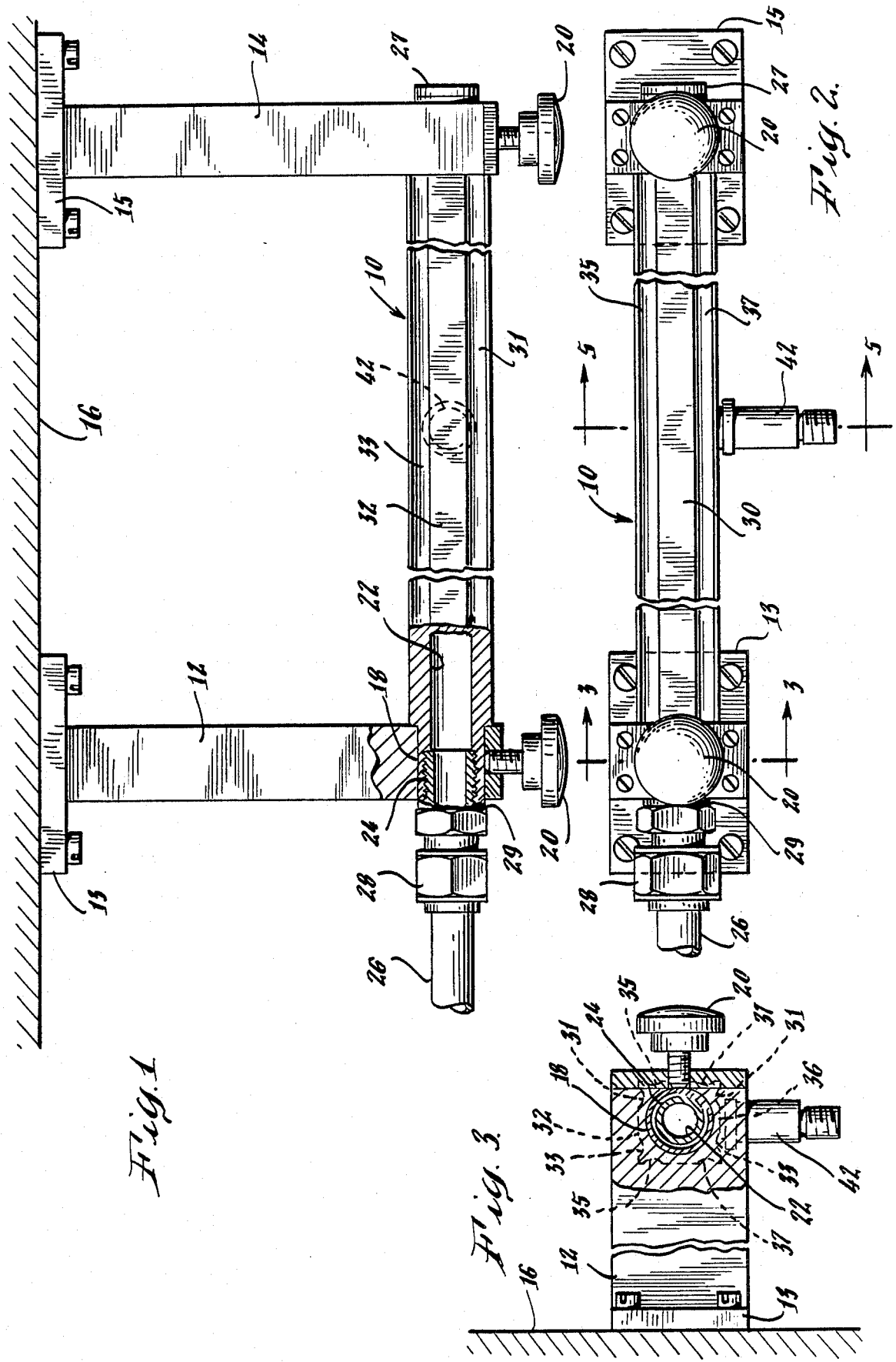

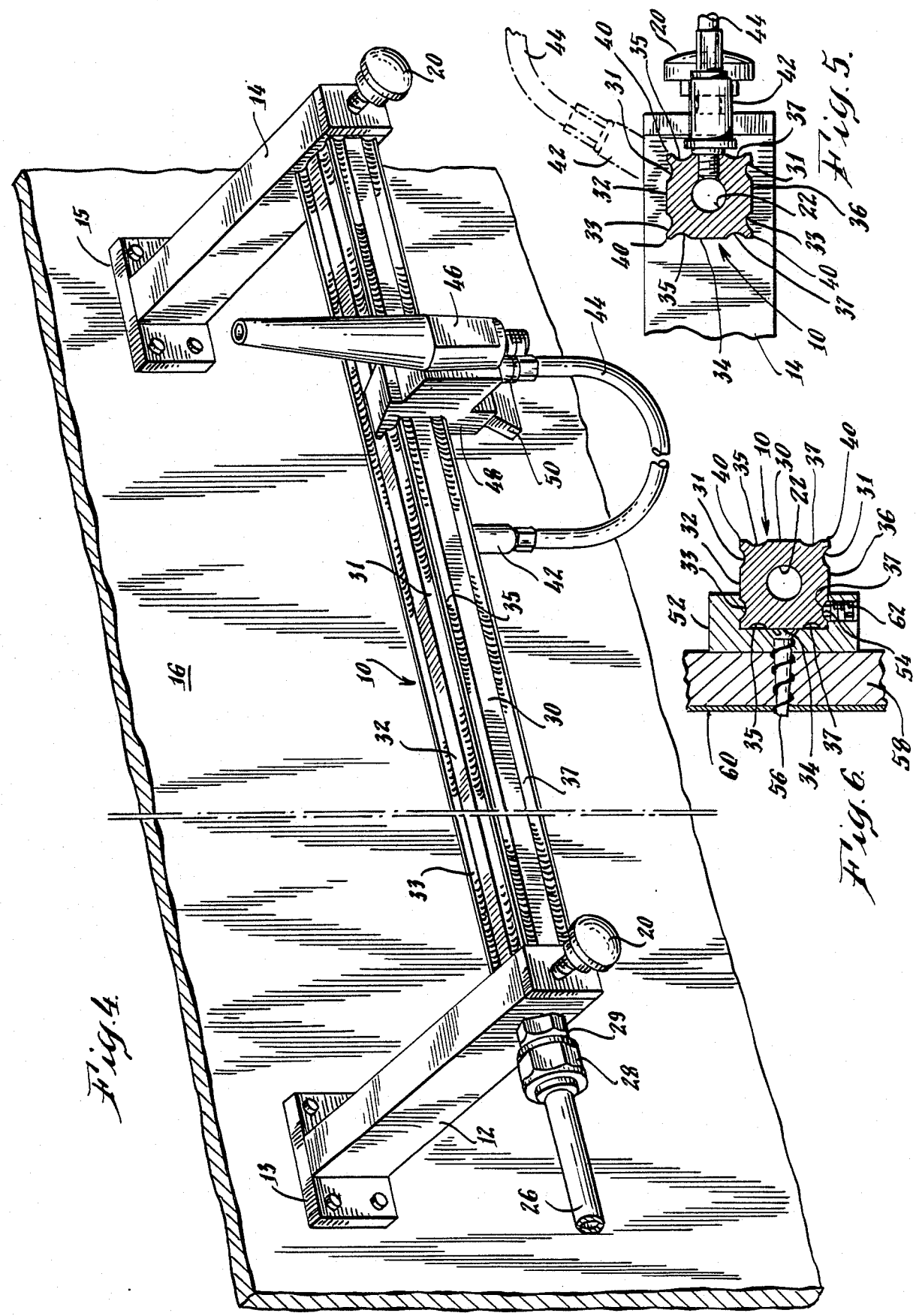

SYMMETRICAL SINGLE MEDICAL GAS RAIL APPARATUS

BACKGROUND OF THE INVENTION

This invention relates to a medical rail system, and more particularly to a medical gas rail system having a single, symmetrical medical gas rail for conducting fluid flow such as oxygen, air, vacuum, nitrogen or nitrous oxide or for providing a vacuum which may be mounted in four different positions or rotatably mounted in at least four positions and in which medical equipment may be removably mounted thereon in all four positions.

Medical facilities such as hospital emergency rooms, hospital operating rooms, doctor's examination rooms as well as patient care rooms normally require a plethora of medical equipment, apparatus and devices and various gas outlets for supplying access to fluid flow such as air, oxygen, nitrogen, nitrous oxide or a vacuum. Fluid flow is usually provided by individual outlets providing limited access as well as inflexibility of the system. In planning the provision for such outlets in the various medical rooms involved, it is difficult because of the ever-changing nature of medical equipment and the change in treatment required. Accordingly, medical facilities normally require modification and updating to accommodate upgraded or new medical diagnostic equipment and apparatus. Accordingly, if the medical facility is not planned properly, the outlets, for example, for furnishing fluid flow in the form of a vacuum may not be properly placed thereby requiring long lengths of hose which may get in the way of people performing medical examinations, operations or in caring for the patients. Changing piping or conduits in the walls and ceilings of the rooms involved is simply not feasible nor cost effective.

In U.S. Pat. Nos. 4,498,693 and 4,420,768, which are assigned to the Assignee of the present invention a multiple gas rail system and an electrical medical rail system, respectively, are shown which provide flexibility in outfitting and changing medical facilities by providing rail systems through which fluids flow and electrical conduits are provided.

The present invention is directed to providing the systems of the aforesaid patents with additional flexibility for providing a single medical gas rail which is symmetrical and may be mounted in several fixed positions by a rotatable mounting or a single fixed mounting.

SUMMARY

Accordingly, it is an object of this invention to provide a new and improved single medical gas rail system which accommodates the conduction of fluid flow therein to provide ready access at convenient locations to such fluid flow anywhere along the rail.

Still another object of this invention is to provide a new and improved single medical gas rail system for providing fluid flow which is readily movably attached and may be mounted in a variety of positions to accommodate providing a single fluid flow outlet in a variety of positions.

Another object of this invention is to provide a new and improved single medical gas rail system which is flexible, relatively inexpensive and provides a flexible, modular attractive type of installation which may be installed or removed in accordance with the desires of the user.

Still a further object of this invention is to provide a new and improved single medical gas rail system which not only accommodates convenient fluid flow access, but also provides a mounting structure for other medical equipment which may be mounted thereon regardless of the plurality of positions in which the rail is mounted.

In carrying out this invention in one illustrative embodiment thereof, a single medical gas rail apparatus for providing a fluid flow conduit and ready access to the fluid flow through the rail comprises a symmetrical rail having four faces with spaced, aligned, horizontal, parallel grooves in each of the faces thereof forming four sets of aligned spaced opposed grooves which sets of grooves are adapted to have equipment mounted on the rail utilizing the sets of grooves. Mounting means are provided for mounting the rail in four positions in which a different one of said four faces of said rail faces forwardly, thereby permitting the mounting of equipment on the rail in four different sets of the grooves. Access means are provided which are coupled to the rail for providing access to the fluid flow in the rail. The mounting means may be in the form of a block clamp which can be mounted on the wall to position the rail in four different positions or the rail may be rotatably mounted in a pedestal mount to provide the four mounting positions of the rail in the pedestal mount and the pedestal mount may be mounted on the wall or preferably on the floor.

BRIEF DESCRIPTION OF THE DRAWINGS

The invention, together with further aspects, objects, features and advantages thereof will be more clearly understood from the following description taken in conjunction with the accompanying drawings in which like elements bear the same reference numerals throughout the various views.

FIG. 1 is a top view partly in section of the single medical gas rail of the present invention shown rotatably mounted.

FIG. 2 is a front elevational view of the medical gas rail shown in FIG. 1.

FIG. 3 is a cross-sectional view taken along lines 3—3 of FIG. 2.

FIG. 4 is a perspective view of the medical gas rail shown in FIG. 1 illustrating an oxygen flow meter mounted on the rail.

FIG. 5 is a cross-sectional view taken along lines 5—5 of FIG. 2.

FIG. 6 shows the single medical gas rail of the present invention mounted in a stationary mount to a wall.

DESCRIPTION OF THE PREFERRED EMBODIMENTS

Figure 7:
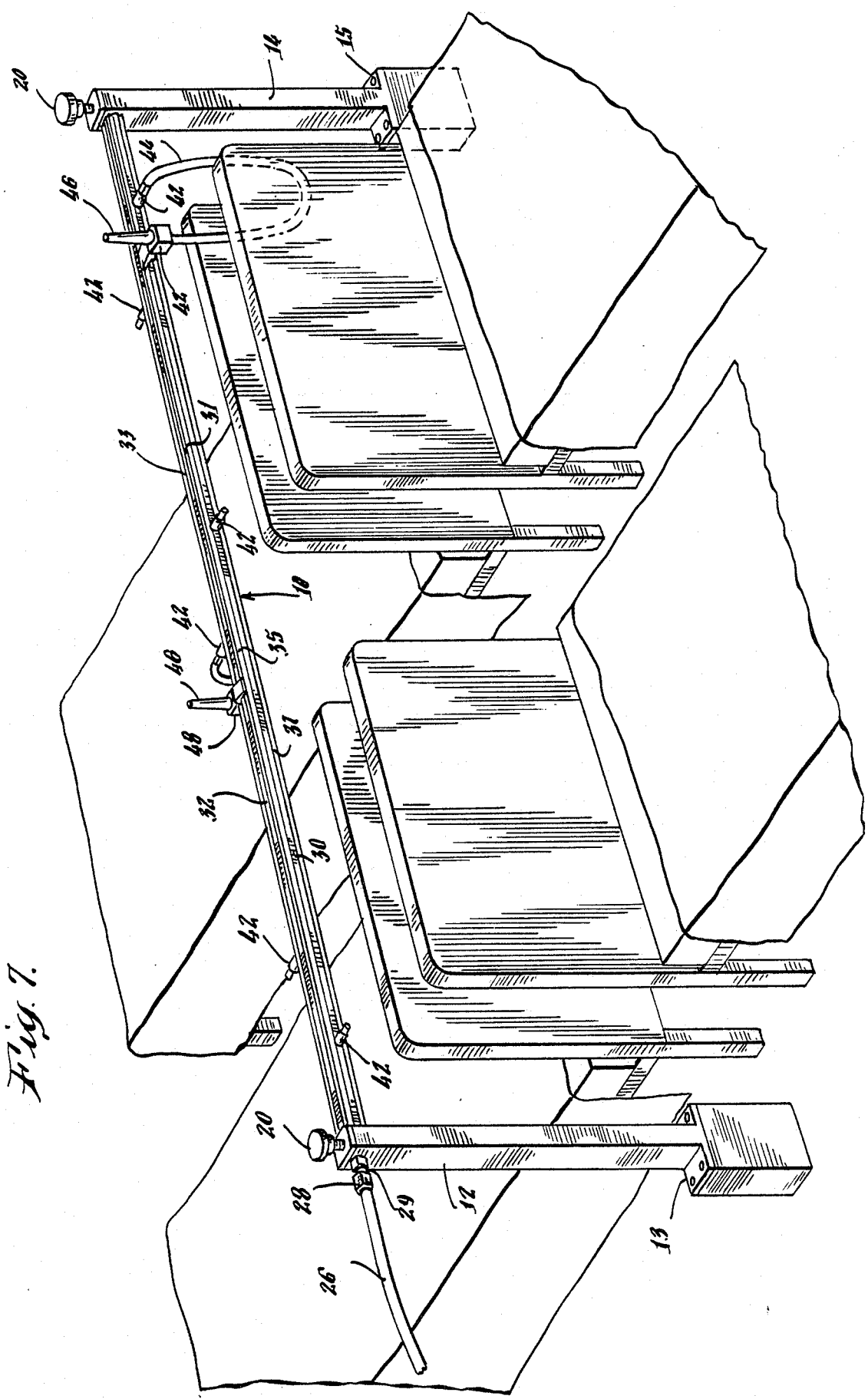
FIG. 7 illustrates the single medical gas rail mounted on a pedestal between two rows of patient care beds.

Referring now to the drawings, in FIG. 1 a single medical gas rail, referred to generally with the reference numeral 10, is rotatably mountable in a pair of arms 12 and 14 having bases 13 and 15, respectively, which are mounted on a wall 16 which could, of course, be a floor or ceiling, if desired. Medical gas rail 10 has flanges 18 on each end which fit in and are rotatable in the respective arms 12 and 14. A pair of set screws 20 mounted at each end of the rail 10 are adapted when tightened in the arms 12 and 14 to contact the flange portions 18 to lock and unlock the rail 10 in its mounts 12 and 14. The rail 10 has a central opening 22 therein which is adapted to be a conduit for fluid flow such as oxygen, air, nitrogen, nitrous oxide or a vacuum. Such gases or a vacuum are useful in medical applications. The inner end portions of the opening 22 are internally threaded on the flanges 18 to receive a gas feeder pipe 26 having a compression fitting 28 which is threaded at 29 to fit into and secure the feeder pipe 26 in the end of the central opening 22. A plug 27 is applied to the other end of the rail 10 to close it off. If desired, a joinder section could replace the plug 27 in order to add another rail link onto the rail 10 to provide a longer rail and greater access to the fluid flow furnished by the feeder pipe 26.

As will best be seen in FIG. 6, in profile the medical gas rail 10 is generally square shaped having flat faces 30, 32, 34 and 36 separated by four sets of aligned, horizontal, parallel sets of grooves 31, 33, 35 and 37 which sets of grooves are all on opposite sides of the eared corners 40. The parallel horizontal sets of grooves are utilized for mounting medical equipment, lighting and other apparatus on the ail 10 such that the rail performs a dual function of not only supplying fluid flow but also acting as a mount for the medical equipment which is being used therewith.

It will be observed that the single gas rail 10 has a symmetrical configuration and accordingly is adapted to be positioned in four 90° positions in a 360° field of rotation which in effect will always place one of the flat faces 30, 32, 34 or 36 facing forwardly with the set screw locked in a position as illustrated in FIG. 3. In FIG. 2 a gas coupler 42 is coupled to the central opening 22 which contains the gas flow in the medical gas rail 10 providing a means of providing a gas outlet along the rail 10. The gas outlet 42 may be placed in any location or may be spaced along the rail and plugged when not in use. The outlets 42 may be placed through any of the flat faces 30, 32, 34 or 36 in a manner illustrated in FIG. 5 such that the coupling is in communication with the central opening 22 of the gas rail 10 which provides the fluid flow desired to be tapped. A hose assembly 44 provides a link or fluid flow to the equipment in which it is used.

FIG. 4 illustrates the hose assembly 44 connected to an oxygen flow meter 46 which is mounted on a block clamp 48 operated by a clamp leverl 50. The block clamp 48 is adapted to clamp into an aligned set of grooves namely, grooves 31, 33, 35 or 37 and accordingly the oxygen flow meter 46 as illustrated in FIG. 4 will fit in a set of grooves depending on the position of the rail in its mount 14 and 12. The rail of course, will accommodate other types of apparatus such as lighting equipment, medical instruments and other devices which are used in the medical facilities. This provides a convenient storage place for such apparatus when not in use and a convenient access to such instruments when in use.

As will be seen in FIG. 6, the medical gas rail 10 may also be mounted in a fixed mount in the form of a mounting block 52 having a central opening 54 thereof which is adapted to receive one of the faces 30, 32, 34 or 36 and its associated corners 40 of the medical gas rail 10. The block 52 is mounted by a metal screw 54 through a wall 58 backed by a metal stud 60. The block mount 52 has a set screw 62 which is adapted to contact the lower groove 33 of the set of grooves 33, or for that matter, the lower groove of any of the sets of grooves to secure the rail in place. In this configuration the rail can be mounted in four 90° positions in a field of 360°. The purpose, of course, of having this symmetrical rail with either a rotatable or fixed mount provides flexibility in allowing the rail to be mounted in four different positions. Since access can be provided to the fluid flow carried by the rail 10 along any of its faces great flexibility is provided for supplying fluid flow to the medical facility in which the rail is employed, which of course is one of the purposes of the invention. This eliminates the fixed nature of previous fluid flow systems with their customary fixed piping which have no flexibility.

This flexibility is demonstrated in the pedestal mounting of the single medical gas rail 10 as above in FIG. 7. The arms 12 and 14 carrying rail 10 have the respective bases 13 and 15 mounted on pedestals 64. The pedestals 64 may be separated as shown or may be in one piece and could be of any desirable height. The rail 10 is shown positioned above the beds 66 for ease of illustration to clearly show the outlets 42 spaced along the rail on either side thereof in order to service beds positioned on opposite sides of the rail 10. The rail would probably conveniently extend between the rows of beds at a convenient height for use of the fluid flow in the rail as well as at a convenient height to position medical equipment, lighting, etc., thereon. The pedestal mounting can be arranged or changed as desired because the feeder pipe 26 can be placed on either side and coupled to a fixed fluid flow outlet in the wall, ceiling or floor without material inconvenience. As will be apparent, the single gas rail 10 with multiple access on any side and at spaced intervals along the rail, provides the ultimate in flexibility and convenience both in installation and use. In addition the arrangement may be readily altered to accommodate the addition of beds and equipment or a change in their positioning in a given facility.

Accordingly, a very flexible, single medical gas rail system is provided which may be mounted in several positions using either a rotatable or a fixed mounting arrangement. The rail in accordance with the present invention may be readily removed from its mount, sterilized, reinstalled and used for a different type of fluid flow as long as prescribed safety standards are met providing different sized coupling outlets for different fluid flows. In that regard the four faces of the single rail could be equipped with different gas couplers in each face to accommodate the use of the same rail for supplying four different fluid flows. The faces could also be labelled specifying the type of fluid flow supplied from that particular face. Of course, the other unused gas couplers would be plugged or otherwise closed off and the rail would have to be connected to the feeder pipe which furnished the desired fluid flow. The pedestal rotatable mounting arrangement would permit using the system in conjunction with fixed piping in regular facilities to provide a tap-in to that fixed supply without tearing up or changing the piping merely by coupling the flexible single rail system with its pedestal mount to the fixed piping arrangement. After use, the single rail medical system could be removed or moved to other positions in the room if desired.

The ability to use the single medical rail as a mounting structure for other medical equipment is not affected by its mobility nor its ability to be varied and mounted in different positions in view of the symmetrical nature of the rail which may be considered universal because of its positioning and flexibility.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A fluid rail apparatus for providing a conduit for the conduction of a fluid therethrough and provides ready access to the said fluid at any convenient location along said rail comprising:
   a symmetrical rail with first and second end and having a central opening therethrough:
   means for coupling a fluid feed line to said first end,
   said symmetrical rail having a generally square configuration with four corners and having four sets of aligned, spaced, opposed grooves located on opposite sides of each corner such that the front profile of the said rail is the same even when the rail is rotated 360° in 90° increments,
   said rail being adapted to mount apparatus thereon in said at least one set of said aligned, spaced, opposed grooves in any given position of 90° in a 360° field,
   access means coupled to said rail for providing access to the fluid flow in said rail, and
   mounting means for removably mounting said rail on a surface.

2. The fluid rail apparatus as claimed in claim 1 wherein said mounting means mounts said rail thereon at said first and second ends of said rail.

3. The fluid rail apparatus as claimed in claim 2 wherein said rail is rotatably mounted in said mounting means.

4. The fluid rail apparatus as claimed in claim 1 wherein said mounting means comprises wall mounting block with a channel therein for receiving said rail and a set screw therein adapted to engage one of said grooves in said rail when said rail is positioned in said channel in said mounting block.

5. A single medical gas rail apparatus for providing a fluid flow conduit and ready access to the fluid flow through said rail comprising:
   a symmetrical rail having four faces with spaced, aligned, horizontal, parallel grooves in each of the faces thereof forming four sets of aligned, spaced, opposed grooves which sets of grooves are adapted to having equipment mounted on said rail using said sets of grooves,
   mounting means for mounting said rail in four positions in which a different one of said four faces of said rail faces forwardly, thereby permitting the mounting of equipment on said rail in a different set of said grooves and
   access means coupled to said rail for providing access to the fluid flow in said rail.

6. The single medical gas rail apparatus as claimed in claim 5 wherein said rail is rotatably mounted in said mounting means.

7. The single medical gas rail apparatus as claimed in claim 6 wherein said mounting means includes a locking means for fixedly positioning said rail in at least four 90° positions in a 360° field.

8. The single medical gas rail as claimed in claim 6 wherein said mounting means included a pedestal mounting means.

* * * * *